O. S. MOORE & W. N. METCALF.
MOWING MACHINE.
APPLICATION FILED JUNE 30, 1917.
1,256,153.
Patented Feb. 12, 1918.
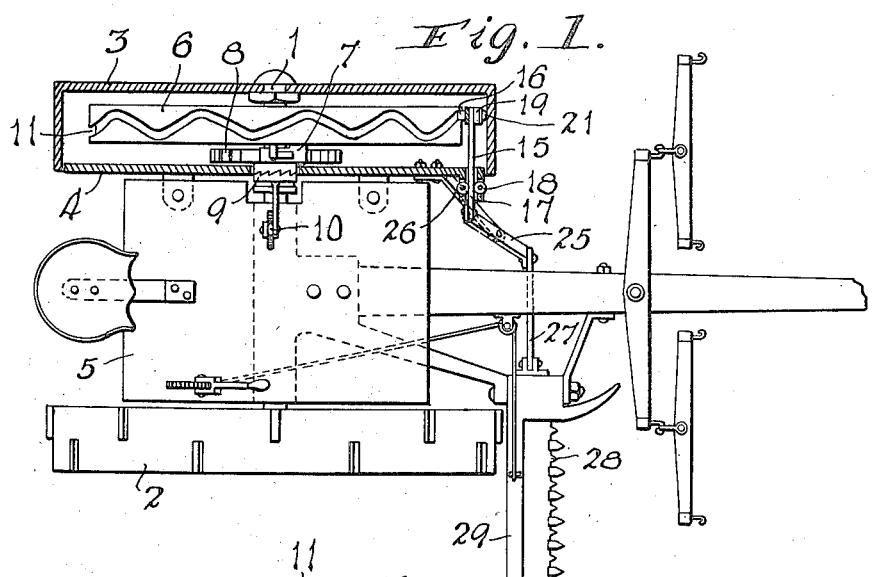
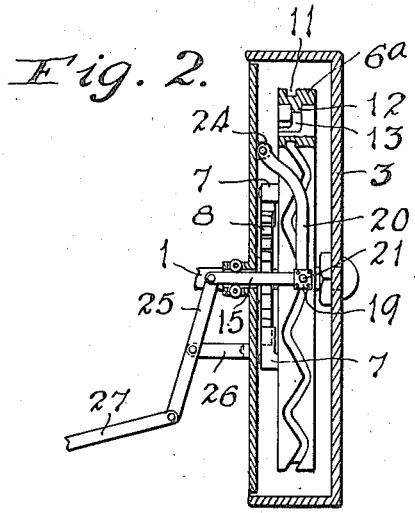
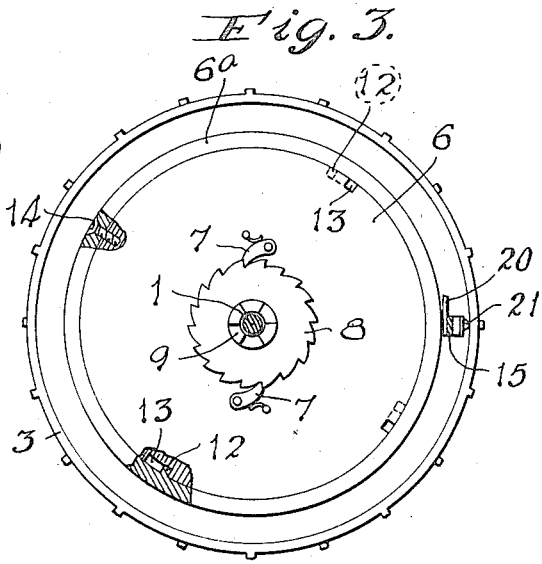
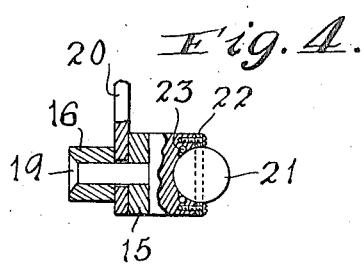
Inventors
O. S. MOORE AND
W. N. METCALF
By H. S. Hill
Attorney

UNITED STATES PATENT OFFICE.

OLIVER S. MOORE AND WALTER N. METCALF, OF EVENING SHADE, ARKANSAS.

MOWING-MACHINE.

1,256,153.  Specification of Letters Patent.  Patented Feb. 12, 1918.

Application filed June 30, 1917. Serial No. 177,942.

*To all whom it may concern:*

Be it known that we, OLIVER S. MOORE and WALTER N. METCALF, citizens of the United States, residing at Evening Shade, in the county of Sharp, State of Arkansas, have invented a new and useful Mowing-Machine; and we do hereby declare the following to be a full, clear, and exact description of the invention, such as will enable others skilled in the art to which it appertains to make and use the same.

The present invention relates to certain new and useful improvements in mowing machines, and has for its object to provide a device of this character which embodies novel features of construction whereby the cutting mechanism is actuated directly from the drive wheels with a minimum amount of gearing, thereby greatly reducing the loss of power due to friction and practically eliminating side draft.

Further objects of the invention are to provide a mowing machine which embodies a simple and inexpensive mechanism for operating the cutter, which comprises few and durable parts such as are not liable to break or get out of repair, which can be easily drawn across a field by draft animals, and which is at all times under the perfect control of the operator.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a top plan view of a mowing machine constructed in accordance with the invention, portions being broken away and shown in section to illustrate more clearly the details of construction.

Fig. 2 is a front elevation of the driving wheel, portions being broken away and shown in section to illustrate the cam wheel and coöperating mechanism arranged within the same.

Fig. 3 is a side elevation of the drive wheel, viewing the same from the inner face thereof, portions of the cam wheel being broken away and shown in section to illustrate the means for mounting the detachable rim thereon.

Fig. 4 is an enlarged detail view of the inner end of the horizontally reciprocating bar, showing the roller bearings thereon, portions being broken away and shown in section to illustrate more clearly the details of construction.

Corresponding and like parts are referred to in the following description and indicated in all the views of the drawings by the same reference characters.

Referring to the drawings which illustrate one embodiment of the invention, the numeral 1 designates an axle which extends transversely across the mowing machine in the usual manner and has the drive wheels 2 and 3 rigidly applied to the ends thereof, the wheel 2 being of the conventional construction, while the wheel 3 is in the form of a hollow casing which has the open inner side thereof closed by a plate 4 mounted upon the platform 5. This plate 4 is held rigidly in position and coöperates with the hollow wheel 3 to provide a substantially dustproof housing within which a cam wheel 6 is arranged, said cam wheel being loose upon the axle 1 and being adapted to be locked therewith when the machine is in operation. Pawls 7 upon the cam wheel 6 are provided for engagement with a ratchet disk 8 which is loose upon the axle 1 and constructed to be locked with the axle by means of a suitable clutch 9. A convenient hand lever 10 is provided for manipulating the clutch 9, and when the mowing machine is in operation the ratchet disk 8 is locked with the axle 1. If the machine is now advanced in a forward direction the pawls 7 will engage the ratchet disk 8 and cause the cam wheel 6 to turn with the axle. On the other hand, if the machine is moved backward the pawls 7 will slip over the ratchet disk 8 and permit the axle 1 to turn independently of the cam wheel 6.

A detachable rim $6^a$ is fitted upon the cam wheel 6, said rim being formed with a continuous cam groove 11 which extends around the periphery of the wheel and zigzags back and forth across the rim. Any suitable means may be provided for locking the rim $6^a$ in position upon the wheel 6, and in the present instance it is shown as provided with inwardly extending lugs 12 which are arranged to engage bayonet slots 13 in the wheel 6, the direction of the bayonet slots being such that the rotation of the cam wheel when in operation will tend to maintain the lugs 12 in an interlocking engagement with the bayonet slots. A bolt 14 may also be provided to lock the rim 6ª against rotation upon the cam wheel 6, this bolt being removable when it is desired to dismount the cam rim 6ª.

Extending through an opening in the front of the plate 4 is a horizontal reciprocating plunger 15 which is provided at its inner end with a roller 16 arranged for engagement with the cam groove 11 extending around the wheel 6. A guide sleeve 17 projects from the plate 4 and surrounds the plunger 15, said guide sleeve having anti-friction rollers 18 journaled therein for engagement with the plunger to direct the same in its back and forth movements and enable it to operate without binding or undue friction. The roller 16 at the inner end of the plunger is connected thereto by means of a pivot bolt 19, said pivot bolt also engaging a swinging hanger 20, and having the head thereof recessed to receive a ball 21 which has a rolling contact with the inner face of the rim portion of the hollow drive wheel 3. A retaining ring 22 may be provided for holding the ball 21 in position upon the head of the pivot bolt, and the ball 21 may itself be supported by small anti-friction balls 23 arranged within suitable raceways in the head of the bolt. The hanger 20 extends upwardly from the reciprocating plunger 15 and is pivotally connected to a small bracket 24 projecting inwardly from the plate 4. This hanger 20 serves to support the reciprocating plunger 15 and prevent it from moving in the direction of rotation of the cam wheel, thereby causing it to be reciprocated back and forth by reason of the engagement of the roller 16 with the zigzag cam groove 11 which extends around the periphery of the cam wheel 6. The mechanism is such that there will be practically no binding of the parts in the operation of the machine, and the rotary motion of the wheels will be transformed into a reciprocating motion with a minimum amount of friction and but little loss of power.

The outer end of the reciprocating plunger 15 is pivotally connected to the upper end of an upright lever 25, said lever being pivotally mounted at an intermediate point between its ends upon a supporting bracket 26 projecting outwardly from the plate 4. The lower end of this upright lever 25 is connected by a pitman 27 to a reciprocating knife blade 28 which is mounted in the usual manner upon the finger bar 29. Any conventional mechanism may be provided for swinging the finger bar and cutter upwardly for the purpose of clearing a stump, stone or other obstruction, or to admit of the machine passing through a gate or narrow opening. The use of this machine will practically eliminate side draft, and the mechanism is very simple. It will be understood that this construction is equally well adapted for use upon reapers as upon mowers.

Having thus described the invention, what we claim as new and desire to secure by Letters Patent, is:—

1. A mowing machine including an axle, drive wheels rigid with the axle, one of the drive wheels being hollow and open at one side, a fixed plate closing the open side of the hollow drive wheel, a cam wheel loose upon the axle within the hollow drive wheel and surrounded by a zigzag cam groove, means for locking the cam wheel with the axle, a transversely reciprocating plunger extending through the fixed plate and provided at its inner end with a roller which is received within the zigzag groove of the cam wheel, a swinging hanger carried by the fixed plate and supporting the reciprocating plunger, anti-friction means upon the end of the plunger for engagement with the inner face of the rim of a hollow drive wheel, a cutter, and an operative connection between the outer end of the reciprocating plunger and the cutter.

2. A mowing machine including an axle, drive wheels applied to the ends of the axle, one of the drive wheels being hollow and open upon one side thereof, a fixed plate closing the open side of the hollow drive wheel, a cam wheel loose upon the axle within the hollow drive wheel and surrounded by a peripherally extending zigzag groove, means for locking the cam wheel with the axle, a transversely reciprocating plunger slidable through the fixed plate, a roller at the inner end of the plunger for engagement with the zigzag groove, a pivot bolt for mounting the roller upon the plunger, an anti-friction ball mounted upon the head of the pivot bolt and arranged for engagement with the inner face of the rim of the hollow drive wheel, a swinging hanger carried by the fixed plate and supporting the reciprocating plunger, a cutter, and an operative connection between the cutter and the reciprocating plunger.

3. A mowing machine including an axle, drive wheels rigid with the axle, one of the drive wheels being hollow and formed with an open side, a fixed plate closing the open side of the drive wheel, a cam wheel arranged within the hollow drive wheel and loose upon the axle, said cam wheel being surrounded by a peripherally extending zigzag groove, means for locking the cam wheel with the axle, a transversely reciprocating plunger slidable through the fixed plate and having a roller at its inner end for engagement with the zigzag groove, a pivot bolt for mounting the roller upon the reciprocating plunger, said bolt being formed with a recessed head, an anti-friction ball mounted upon the recessed head of the bolt for engagement with the inner face of the rim of the hollow drive wheel, a retaining ring for holding the anti-friction ball in position, a swinging hanger carried by the fixed plate and supporting the reciprocating plunger, a cutter, and an operative connection between the cutter and the reciprocating plunger.

4. A mowing machine including an axle, drive wheels applied to the axle, one of the drive wheels being hollow and formed with an open side, a fixed plate closing the open side of the hollow drive wheel and formed with an opening surrounded by a guide sleeve which projects laterally from the plate, a cam wheel arranged within the hollow drive wheel and loose upon the axle, means for locking the cam wheel with the axle, a detachable rim surrounding the cam wheel and provided with a peripheral zigzag groove, a transversely reciprocating plunger slidable through the guide sleeve of the plate and provided at its inner end with a roller for engagement with the zigzag groove of the cam wheel, a pivot bolt connecting the wheel to the reciprocating plunger, an anti-friction ball mounted upon the head of the pivot bolt for engagement with the inner face of the rim of the hollow drive wheel, a swinging hanger carried by the fixed plate and engaging the said pivot bolt to support the reciprocating plunger, a cutter, and an operative connection between the cutter and the reciprocating plunger.

In testimony whereof we have signed our names to this specification in the presence of two subscribing witnesses.

OLIVER S. MOORE.
WALTER N. METCALF.

Witnesses:
J. R. METCALF,
EDGAR WASSON.